United States Patent
Chen

(10) Patent No.: US 10,678,861 B2
(45) Date of Patent: Jun. 9, 2020

(54) PERSONALIZED POST SESSION MODEL FOR AN ONLINE SYSTEM

(71) Applicant: Facebook, Inc., Menlo Park, CA (US)

(72) Inventor: Si Chen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 719 days.

(21) Appl. No.: 15/392,998

(22) Filed: Dec. 28, 2016

(65) Prior Publication Data

US 2018/0181873 A1 Jun. 28, 2018

(51) Int. Cl.
| | |
|---|---|
| *G06F 16/903* | (2019.01) |
| *G06Q 30/02* | (2012.01) |
| *H04L 29/08* | (2006.01) |
| *G06N 20/00* | (2019.01) |
| *G06Q 50/00* | (2012.01) |
| *G06F 16/9535* | (2019.01) |
| *G06Q 30/06* | (2012.01) |
| *H04L 12/58* | (2006.01) |

(52) U.S. Cl.
CPC .... *G06F 16/90335* (2019.01); *G06F 16/9535* (2019.01); *G06N 20/00* (2019.01); *G06Q 30/02* (2013.01); *G06Q 30/06* (2013.01); *G06Q 50/01* (2013.01); *H04L 67/26* (2013.01); *H04L 67/306* (2013.01); *H04L 51/32* (2013.01); *H04L 67/20* (2013.01)

(58) Field of Classification Search
CPC .......... G06F 16/90335; G06F 16/9535; G06N 20/00; G06Q 30/02
USPC ....................................................... 707/723
See application file for complete search history.

(56) References Cited

U.S. PATENT DOCUMENTS

| | | | | |
|---|---|---|---|---|
| 8,108,414 | B2 * | 1/2012 | Stackpole | G06Q 10/10 707/758 |
| 8,626,768 | B2 * | 1/2014 | Bailey | G06F 16/358 707/738 |
| 9,165,305 | B1 * | 10/2015 | Chandra | G06F 12/06 |
| 9,881,255 | B1 * | 1/2018 | Castellanos | G06F 16/9574 |
| 2010/0076850 | A1 * | 3/2010 | Parekh | G06Q 30/02 705/14.66 |
| 2010/0185689 | A1 * | 7/2010 | Hu | G06Q 30/02 707/803 |

(Continued)

FOREIGN PATENT DOCUMENTS

WO WO-2014068573 A1 * 5/2014 .......... G06F 17/274

*Primary Examiner* — Shahid A Alam

(74) *Attorney, Agent, or Firm* — Fenwick & West LLP

(57) ABSTRACT

An online system selects a number of content items and presents the selected content items through a feed to a target user, where each selected candidate content item is likely to cause the target user to post his/her new content in response to the selected candidate content item within a short period of time. The online system selects the candidate content items for presentation through the feed using a trained post session prediction model. A ranking score for a candidate content item is determined based on a probability value indicating likelihood that the candidate content item causes the target user to post new content. The probability value is determined by applying a trained model to user features of the target user and content features of the candidate content item. The online system ranks the candidate content items based on their ranking scores and present the feed to the target user.

18 Claims, 5 Drawing Sheets

(56) References Cited

U.S. PATENT DOCUMENTS

| | | | |
|---|---|---|---|
| 2011/0258049 A1* | 10/2011 | Ramer | G06Q 30/02 705/14.66 |
| 2012/0011204 A1* | 1/2012 | Morin | G06Q 10/10 709/205 |
| 2012/0124508 A1* | 5/2012 | Morin | H04L 51/32 715/781 |
| 2013/0211910 A1* | 8/2013 | Yerli | G06Q 30/0251 705/14.53 |
| 2013/0232159 A1* | 9/2013 | Daya | G06Q 50/01 707/758 |

* cited by examiner

| Candidate Content Item | Probability Value | Weight of Posting New Content | Posting Score | Rank No. | Presentation Order |
| --- | --- | --- | --- | --- | --- |
| A | 10% | 50 | 5 | 7 | 7 |
| B | 70% | 50 | 35 | 2 | 2 |
| C | 55% | 50 | 27.5 | 5 | 5 |
| D | 40% | 50 | 20 | 6 | 6 |
| E | 2% | 50 | 1 | 8 | - |
| F | 95% | 50 | 47.5 | 1 | 1 |
| G | 66% | 50 | 33 | 3 | 3 |

FIG. 4

PERSONALIZED POST SESSION MODEL FOR AN ONLINE SYSTEM

BACKGROUND

This disclosure relates generally to digital content in online systems, and more particularly to a personalized post session model for presenting selected content items in a newsfeed for a target user, where the target user is likely to post his/her original new content on the selected content items.

Online systems have become increasingly prevalent in digital content distribution and consumption, and allow users to more easily communicate with one another. Users of an online system associate with other online system users, forming a web of connections. Additionally, users may share personal information and other stories with other users connected to them via an online system. Examples of information shared by online system users include contact information, background information, job information, interests, photos, notes, and/or other member-specific data.

An online system presents to a user, e.g., via a newsfeed, stories shared by other users connected to the user on the online system. The newsfeed typically includes a set of stories selected from recently shared stories. Presenting stories in which an online system user is likely to have an interest encourages additional use of the online system by the online system user. An example existing method for presenting selected stories in newsfeeds for a target user of an online system is to analyze connections of the user with other users who contributed to the selected stories in the online system. A user is presumed to be more interested in stories shared by one or more other users connected to the target user, compared with stories shared by the other users who have no connection with the target user in the online system. However, the existing method fails to consider how the target user would likely to interact with the stories to be presented to the target user based on many relevant attributes that would directly impact the selection of the stories to be presented to the target user.

SUMMARY

A personalized post session model is provided for presenting selected content items in a newsfeed for a target user in an online system, where the target user is likely to post his/her original new content on the selected content items. The online system receives multiple candidate content items to be included in the newsfeed for the target user. To select candidate content items for inclusion in the newsfeed and to order the selected candidate content items included in the newsfeed, the online system determines a score for each candidate content item. The score of a candidate content item is generated by a trained post session prediction model (also simply referred to as "trained prediction model"), which generates a probability value indicating likelihood that the candidate content item causes the target user to post his/her new content in the online system. The online system trains the prediction model using machine learning techniques based on training data curated from historical posting activity of users of the online system and attributes of content items posted by the users of the online system. The online system applies the trained prediction model to user features of the target user and content features of each candidate content item to determine the probability value. Examples of user features include positing history of the target user, attributes of posts of the target user, and biographic, demographic, or other types of descriptive information of the target user.

The online system further generates a weighted prediction value of the candidate content item (also referred to as "a posting score of the candidate content item'), e.g., multiplying the probability value with a weight of the target user posting new content. The weight of posting new content can be assigned by operators of the online system manually or by the online system automatically. The online system generates a ranking score for each content item based on the posting score of the content item. In one embodiment, the ranking score of the candidate content item equals to the posting score of the candidate content item. In another embodiment, the online system considers other factors to determine an aggregated ranking score of the candidate content item. For example, the online system generates the aggregated score of the candidate content item by considering contributions from other types of interactions that the target user may perform with the candidate content item, e.g., liking, commenting, sharing, or any combination thereof. For each other types of interaction, the online system may generate a corresponding score, e.g., a liking score, commenting score, and sharing score in the similar way as the generation of the posting score.

The online system ranks the candidate content items based on their corresponding ranking scores. In some embodiments, the newsfeed includes the whole set of the candidate content items. In alternative embodiments, the newsfeed includes a selected number of candidate content items based on the rankings of the candidate content items. The order of the candidate content items to be presented in the newsfeed may also be determined based on their rankings.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 4 show an example of selecting candidate content items for presentation through a newsfeed to a target user using a trained post session prediction model, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
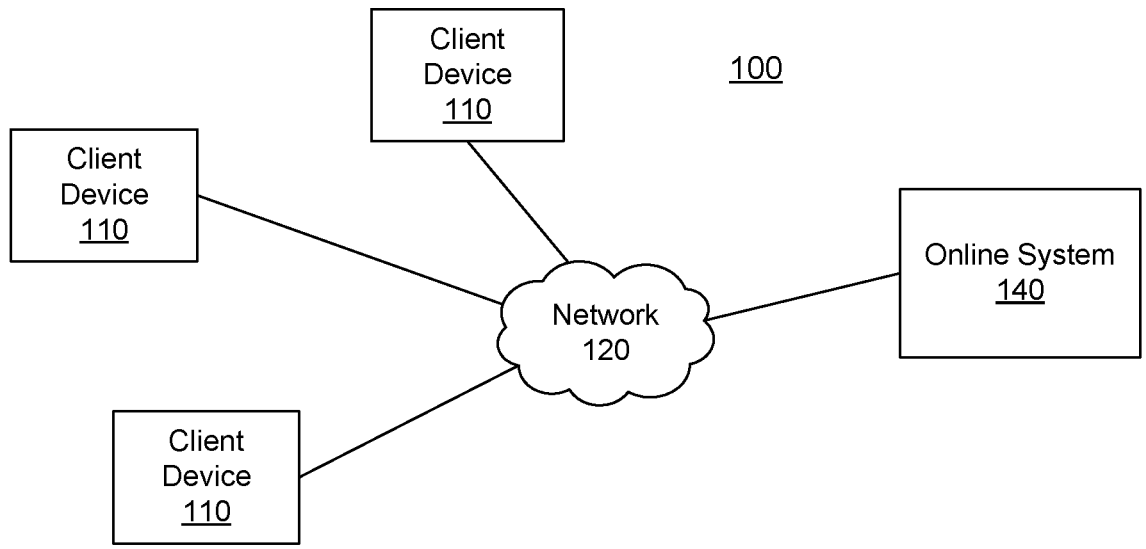
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 2:
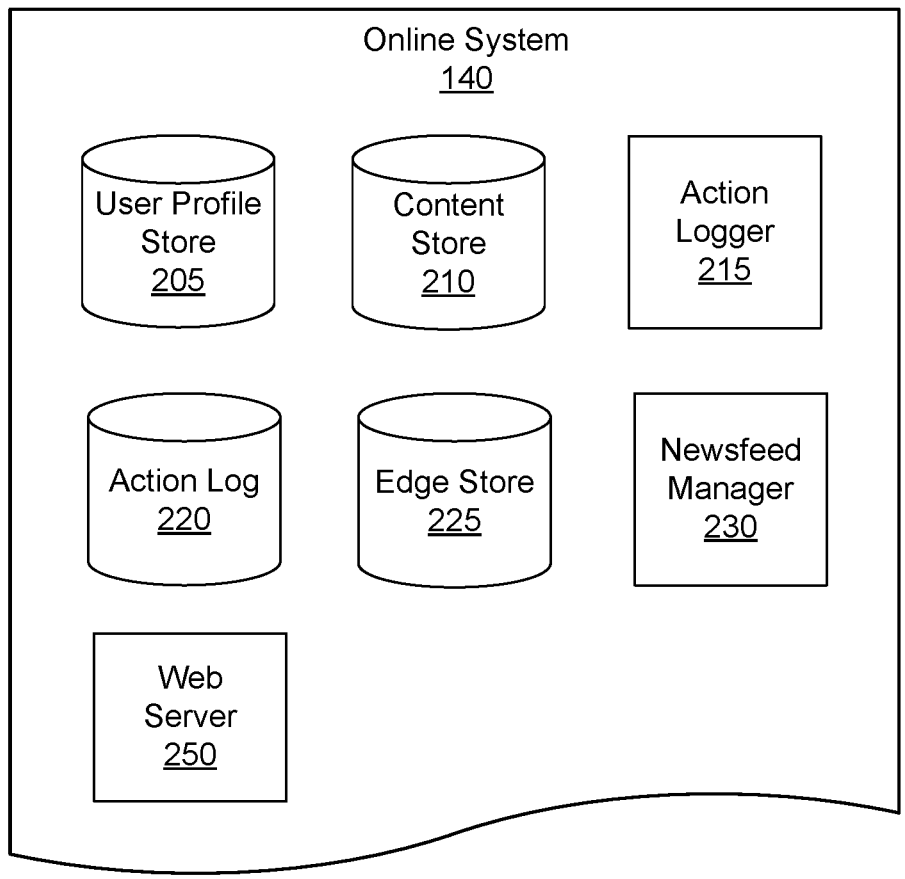
FIG. 2 is a block diagram of an architecture of the online system, in accordance with an embodiment.

FIG. 2 is a block diagram of an architecture of the online system 140, in accordance with an embodiment. The online system 140 shown in FIG. 2 includes a user profile store 205, a content store 210, an action logger 215, an action log 220, an edge store 225, a newsfeed manager 230, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, age, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include posting a comment on a content item presented to a user, posting a new content in response to a content item presented to the user, adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems that communicate information to the online system 140. Users may interact with various objects on the online system 140, and information describing these interactions is stored in the action log 220. Examples of interactions with objects include: providing a comment associated with content items (commenting on content items), posting new content within a short period of time (e.g., within an hour) in response to a content item presented to the user, expressing a preference for content items (e.g., liking content items), sharing content items, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system, including webpage viewing histories, advertisements that were engaged, purchases made, and other patterns from shopping and buying. Additionally, actions a user performs via an application associated with a third party system and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The newsfeed manager 230 identifies candidate content items likely to be of interest to a target user and presents to the target user, through a newsfeed, content items selected from the candidate content items. The newsfeed manager 230 may generate candidate content items for presentation to a user based on information in the action log 220 and in the edge store 225 or may select candidate content items from content items stored in the content store 210. The newsfeed manager 230 accesses the candidate content items to be included in the newsfeed for the target user.

In one embodiment, the newsfeed may include a limited number of candidate content items or may include a complete set of candidate content items. The number of content items included in a newsfeed may be determined in part by a user preference included in user profile store 205. The newsfeed manager 230 selects candidate content items to be included in the newsfeed and also determines an order in which the selected candidate content items are presented via the newsfeed. The selection of candidate content times and determination of the order are based on various criteria. One criterion is likelihood that a candidate content item will cause the target user to post his/her new content within a short period of time (e.g., 1 hour) on the online system 140. For example, the newsfeed manager 230 includes a candidate content item in the newsfeed and puts the candidate content item in front of the newsfeed, upon determination that the likelihood is very high that the candidate content item causes the user to post new content. Another criterion is likelihood of other types of interactions of the target user with a candidate content item, such as like, sharing, comment, etc.

The newsfeed manager 230 may also account for actions by the target user indicating a preference for types of content items and selects content items having the same, or similar, types for inclusion in the newsfeed. Additionally, the newsfeed manager 230 may analyze content items received by the online system 140 from other users of the online system to obtain information about user preferences or actions from the analyzed content items. This information may be used as training data to train a post session prediction model for a target user and to refine subsequent selection of content items for newsfeeds presented to a target user. The newsfeed manager 230 including training the post session prediction model for a target user is further described with reference to FIG. 3.

The web server 250 links the online system 140 via the network 120 to the one or more client devices 110, as well as to the one or more third party systems. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Content Items Selection Based on a Trained Post Session Model

Figure 3:
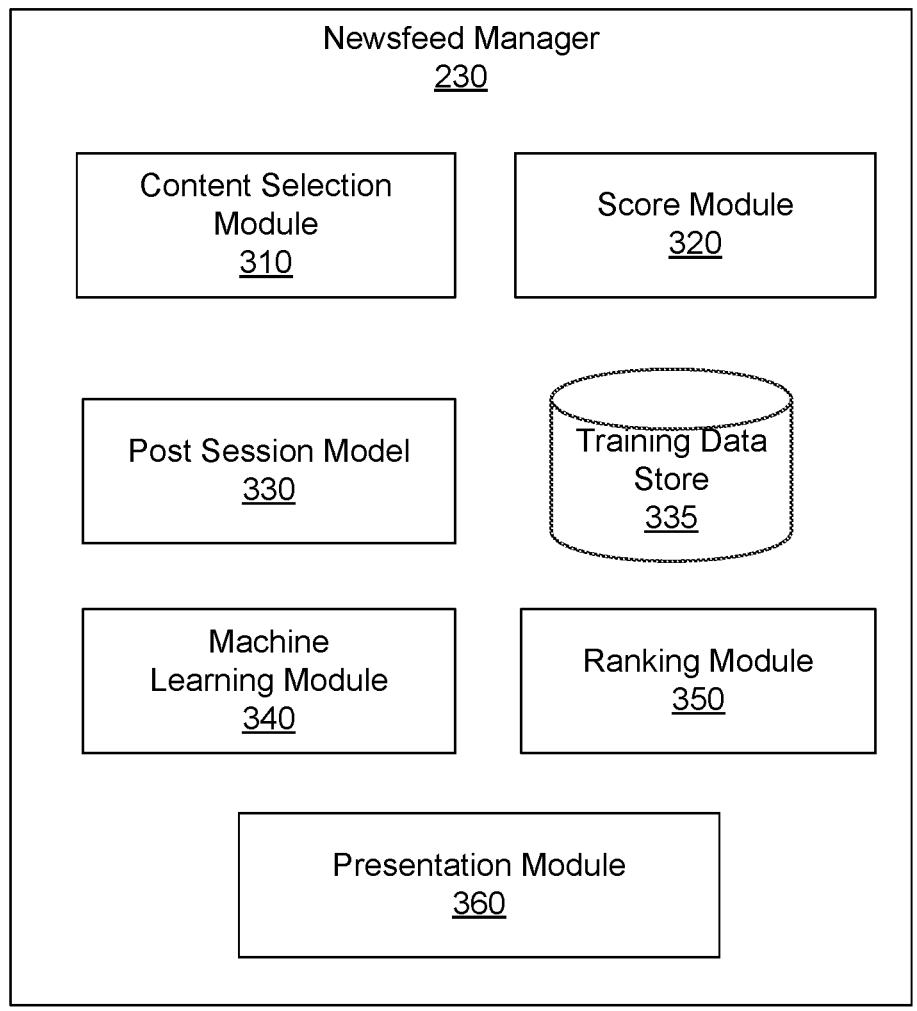
FIG. 3 is a block diagram of a newsfeed manager included in the online system, in accordance with an embodiment.

FIG. 3 is a block diagram of a newsfeed manager 230 included in the online system 140, in accordance with an embodiment. As shown in FIG. 3, the newsfeed manager 230 includes a content access module 310, a score module 320, a post session model 330, a training data store 335, a machine learning module 340, a ranking module 350, and a presentation module 360. In some embodiments, the functions are distributed among the modules in a different manner than described herein. Moreover, the functions are performed by other entities in some embodiments. In other embodiments, the newsfeed manager 230 may include additional, fewer, or different components for various applications.

The content access module 310 identifies and accesses one or more candidate content items to be included in a newsfeed for a target user of the online system 140. The content access module 310 may generate candidate content items for the target user or may select candidate content items from content items stored in the content store 210. In one embodiment, the content access module 310 generates or selects the candidate content items based on information describing actions of the target user on the online system 140 and/or third party systems and connections between the target user and other users. The content access module 310 obtains the information from the action log 220 and the edge store 225.

For example, the content selection module 310 receives a request to present one or more content items to the target user. The content selection module 310 accesses one or more of the user profile store 205, the content store 210, the action log 220, and the edge store 225 to retrieve information about the target user. For example, content items or other data associated with users connected to the target user, such as historical posting activity and content items posted by the users connected to the target user, are retrieved. The retrieved content items or other data are analyzed by the content access module 310 to identify candidate content items. Analysis by the content access module 310 to identify candidate content items include extracting attributes of each retrieved content item, analyzing possible tags or indices that may be assigned to each retrieved content item, determining whether each retrieved content item was shared by the target user or any one of the users connected to the target user, determining whether each retrieved content item reflects the target user's interests and so forth. Upon determining that a content item having at least a threshold likelihood of being of interest to the target user, the content access module 310 identifies the content item as a candidate content items and obtains the candidate content item.

The score module 320 generates a ranking score for each candidate content item selected by the content selection module 310. The ranking score is generated based on a probability value indicating likelihood that a candidate content item will cause the target user to post his/her new content. The probability value is determined based on the post session model 330 trained by the machine learning module 340 on training data stored at the training data store 335. When the trained post session model 330 is applied to the candidate content item and the target user, the post session model 330 outputs a probability value indicating likelihood that the candidate content item will cause the target user to post his/her new content.

The machine learning module 340 trains the post session model 330 using features extracted from a training data set. The machine learning module 340 can store the post session model 330 in the online system 140 and periodically re-train the post session model 330 using features based on updated training data. In one embodiment, a content item is presumed to cause an online system user to post new content if the online system user posts new content within a predetermined time period (e.g., within 1 hour after the online system user is presented the content item). The time period may be determined by operators of the online system or determined by the online system automatically based on the analysis of the training data stored in the training data store 335. The machine learning module 340 retrieves the training data set from the training data store 335.

The training data set includes information about content items received by the online system 140 and historical posting activity information about online system users, e.g., historical posting activity by the online system users who posted new content within in one hour after they were presented the content items (e.g., from the action log 220 or user profile store 205). In one embodiment, the machine learning module 340 excludes from the training data set information about historical posting activity data by the online system users who did not post their new content more than a threshold time period, e.g. after 1 hour of receiving the content items.

The features extracted by the machine learning module 340 from the training data set include one or more feature sets, e.g., content feature sets for the content items in the training data sets and user feature sets for the users who posted their new content in response to the content items presented to them. Each feature set includes a set of user features and a set of content features. Examples of user features include user posting history, attributes of user posts, and user biographic, demographic, or other types of descriptive information. Examples of content features include content topics and content types (e.g., image, text, or web link). The machine learning module 340 may train the post session model 330 using many feature sets, for example, including hundreds of different user features and thousands of different content features.

In some embodiments, the machine learning module 340 uses supervised machine learning to train a first model for selecting content items and a second model for ranking the selected content items. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

The post session model 330 takes user features of the target user and content features of the candidate content item as input and generates a prediction value indicating likelihood that a candidate content item causes the target user to post his/her new content in the online system. The user features describe the target user who will be presented with a candidate content item, such as positing history of the target user, attributes of posts of the target user, and biographic, demographic, or other types of descriptive information of the target user. The content features describe the candidate content item that may be presented to the target user, such as one or more topics and content types associated with the candidate content item. Based on the input, the post session model 330 generates a probability value indicating likelihood that the target user posts new content in response to the candidate content item, i.e., likelihood that the target user posts new content within one hour after the target user is presented with the candidate content item.

For instance, the user features indicate that many posts of the target user are new content about basketball and football and the target user is a 20-30 year old man. The content features indicate that the candidate content item is about basketball. Based on features from previous training data, the post session model 330 determines that target user has a strong tendency to post new content within a short period of time after the target user is presented with the candidate content item. Thus, the post session model 330 generates a high probability score indicating that the candidate content item will likely cause the target user to post new content.

In some embodiments, the content features describe information extracted by the machine learning module 340 from a candidate content item. To generate features to train the post session model 330, the machine learning module 340 can compare the information extracted from the candidate content time with information extracted from reference content items. For example, the reference content items caused the target user to post new content in the past. In other words, the target user posted new content within one hour after they viewed the reference content items. The extracted information from the reference content items indicates that the reference content items, on average, have been viewed and commented by thousands or millions of other online system users. The post session model 330 determines that given the historical post activity by many other users of the online system, the candidate content item may also likely cause the target user to post new content within a short period of time, and represents such likelihood by a prediction value.

Figure 6:
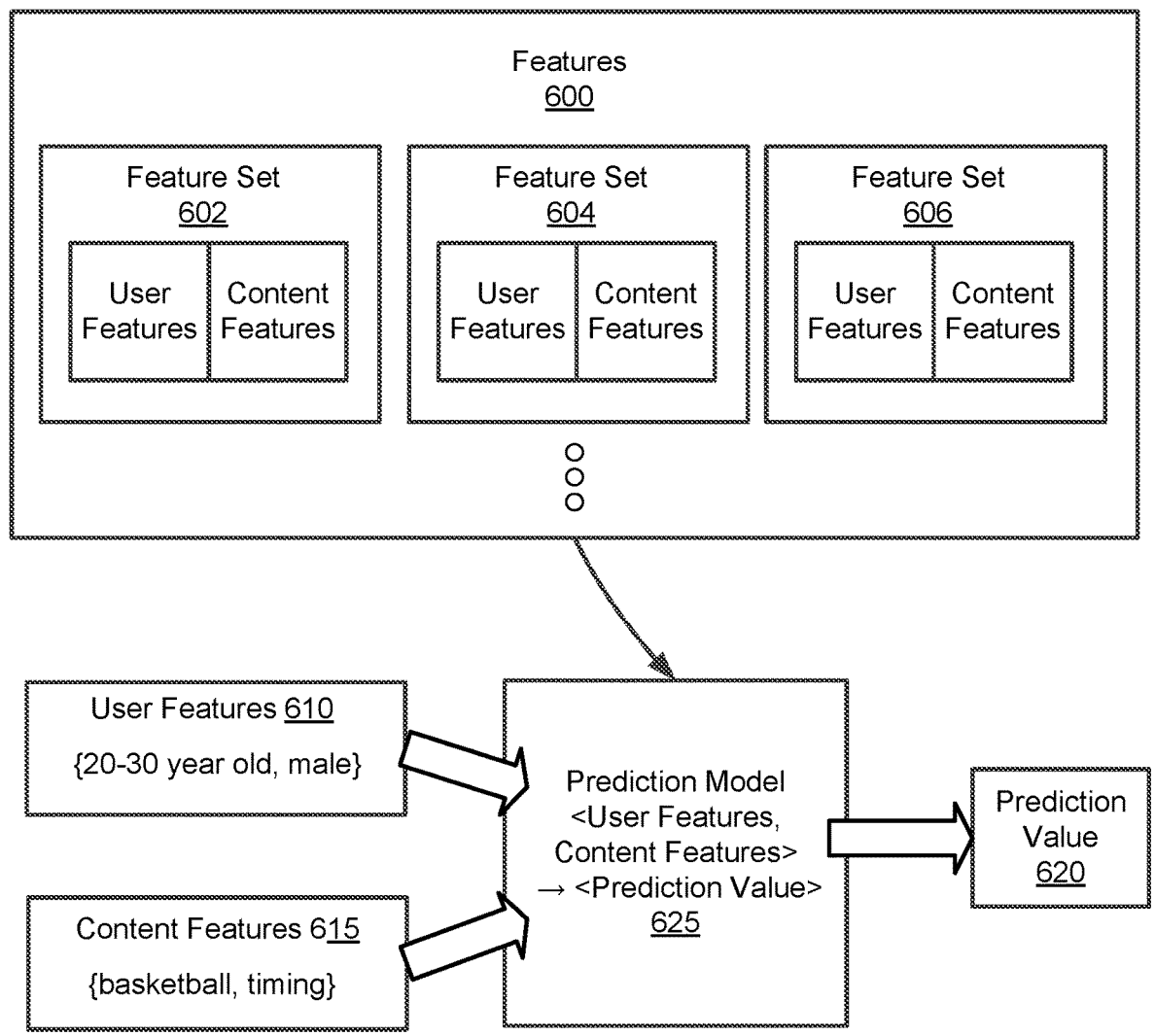
FIG. 6 is a data flow diagram for training a post session prediction model, in accordance with an embodiment.

Turning now to FIG. 6, FIG. 6 is a data flow diagram for training the post session prediction model 330 according to one embodiment. The machine learning module 340 retrieves training data from the training data store 335 and extracts features 600 from the training data. The machine learning module 340 trains the post session model 330 using the features 600. The training data includes information about content items published by the online system 100 and information about users of the online system 100 who interacted with the published content items. The features 600 include one or more feature sets, e.g., feature sets 602, 604, and 606. Each feature set includes a set of user features and a set of content features. Though only three feature sets are shown in FIG. 6, in practice, the machine learning module 340 trains the post session model 330 using many more feature sets, for example, including hundreds of different user features and thousands of different creative features.

The post session model 330 can be associated with a content type, e.g., image, video, or text, or a content topic, e.g., basketball or football. In the example shown in FIG. 6, the post session model 330, associated with content topic, takes as input user features 610 and content features 615. The user features 610 describe a target user who will be presented with a content item on a selected content topic. The content features 615 describe a topic of a content item that may be presented to the target user. Based on the input, the post session model 330 generates a prediction value 625 for the content topic in the context of the target user. For instance, the user features 610 indicate that the target user is a 20-30 year old male user. The content features 615 indicate that the content is about basketball and timing information including when the content item was posted or commented. In some embodiments, the content features 615 indicate a pattern of historical posting activity of a previously published content item on basketball topic. Based on features from previous training data, the post session model 330 determines that 20-30 year old male users have a strong interest in viewing and commenting on content items related to basketball. Thus, the post session model 365 generates a high prediction value 620 indicating that the target user is likely to post his new content within a short period item in response to be presented with a content item on basketball topic.

Turning back to FIG. 3, the score module 320 generates a posting score for a candidate content item indicating a refined prediction that a target user is likely to post his/her new content in response to the candidate content item presented to the target user. In one embodiment, the posting score for a candidate content item is a weighted predication value associated with the candidate content item generated by the post session model 330. For example, the posting score for a candidate content item equals to the product of the probability value of the candidate content time multiplied by a weight assigned to an action of posting new content. The weight of posting new content by the target user may be assigned by operators of the online system 140 based on training from the training data set stored in the training data store 335.

In some embodiments, the score module 320 generates a ranking score for a candidate content item that is equal to the posting score of the candidate content item. In alternative embodiments, the score module 320 generates an aggregated ranking score of the candidate content item by considering contributions from other types of interactions that the target user may perform with the candidate content item, e.g., liking, commenting, sharing, or any combination thereof. The score module 320 obtains an interaction score for each interaction, such as a liking score, a commenting score, or a sharing score. The interaction score for a specific type of interaction is the product of a weight assigned to the specific type interaction multiplied by a probability score indicating likelihood that the target user will interact with the content item in the specified way. The probability score for the interactions can be determined by using other models trained by the machine learning module 340. To training the models, the machine learning module 340 may use a similar process to generate user features and content features for each type of interaction. But user features and/or content features used by the machine learning model 330 for each interaction can be different. For example, for liking, the machine learning model 330 may apply to user liking history, instead of user posting history, as a user feature. In one embodiment, the aggregated ranking score of a candidate content item is a sum of its corresponding posting score and one or more interaction scores.

The ranking module 350 ranks the candidate content items based on the ranking score (or aggregated ranking score) of each of the candidate content items generated by the score module 320. In one embodiment, the ranking scores (or aggregated ranking scores) of the candidate content items explicitly indicate the rankings of the candidate content items. For example, a candidate content item having a higher score is ranked higher than a candidate content item having a lower score.

The presentation module 360 presents a number of content items, selected from the candidate content items, to the target user through a newsfeed. The newsfeed may include a limited number of the candidate content items or may include a complete set of the candidate content items. Accordingly, the presentation module 360 may select all or a subset of the candidate content item. In one embodiment, the number of content items included in a newsfeed may be determined in part by the corresponding aggregated ranking scores of the candidate content items.

In embodiments where the presentation module 360 selects a subset of the candidate content items, the presentation module 360 selects a number of highest ranked candidate content items to present through the newsfeed. The presentation module 360 may also determine the order in which the selected candidate content items are presented via the newsfeed. In one embodiment, the order in which the selected candidate content items are presented is based on the rankings of the candidate content items, e.g., a higher ranked candidate content item receives a higher order. In another embodiment, the presentation module 360 may adjust rankings of the candidate content items based on additional factors. For example, the presentation module 360 determines that the target user has a highest affinity for his influencer and modifies the rankings in the newsfeed for content items from the influencer.

FIG. 4 shows an example of selecting candidate content items for presentation through a newsfeed to a target user using a trained post session prediction model, in accordance with an embodiment. FIG. 4 includes eight candidate content items A-G. In one embodiment, the candidate content items are identified and accessed by the content selection module 310 of the newsfeed manager 230. The candidate content items share one weight of posting new content, which is equal to 50. The weight of posing new content may be determined by operators of the online system 140 or by the machine learning module 330. Each candidate content item has a different probability value indicating different likelihood that the candidate content item will cause the target user to post new content within 1 hour after being presented with the candidate content item. For example, candidate content item A has 10% likelihood to cause the target user to post new content; while candidate content item E has 95% likelihood to cause the target user to post new content. The posting score of each candidate content item is the product of the weight of posting new content multiplied by the probability value of the candidate content item. Because each candidate content item has a different probability value, the posting scores of the candidate content items are different. In one embodiment, the posting score of the candidate content items are generated by the score module 320.

The candidate content items are ranked based on their posting scores, e.g., by the ranking module 350. The candidate content item F has the highest posting score and receives the highest ranking. Likewise, the candidate content item E has the lowest posting score and therefore, receives the lowest ranking. The newsfeed can only include seven content items. Thus, not all the candidate content items can be presented. In one embodiment, the presentation module 360 selects seven candidate content items based on the rankings of the candidate content items. In the embodiment of FIG. 4, the candidate content item E, which has the lowest ranking, is not included in the newsfeed. The selected candidate content items, i.e., A-D and F-G, are presented via the newsfeed. The selected candidate items are ordered based on their rankings, as illustrated by their presentation order numbers in FIG. 4. Thus, the candidate content item F is the first content item in the newsfeed, followed by candidate content items B-A.

Figure 5:
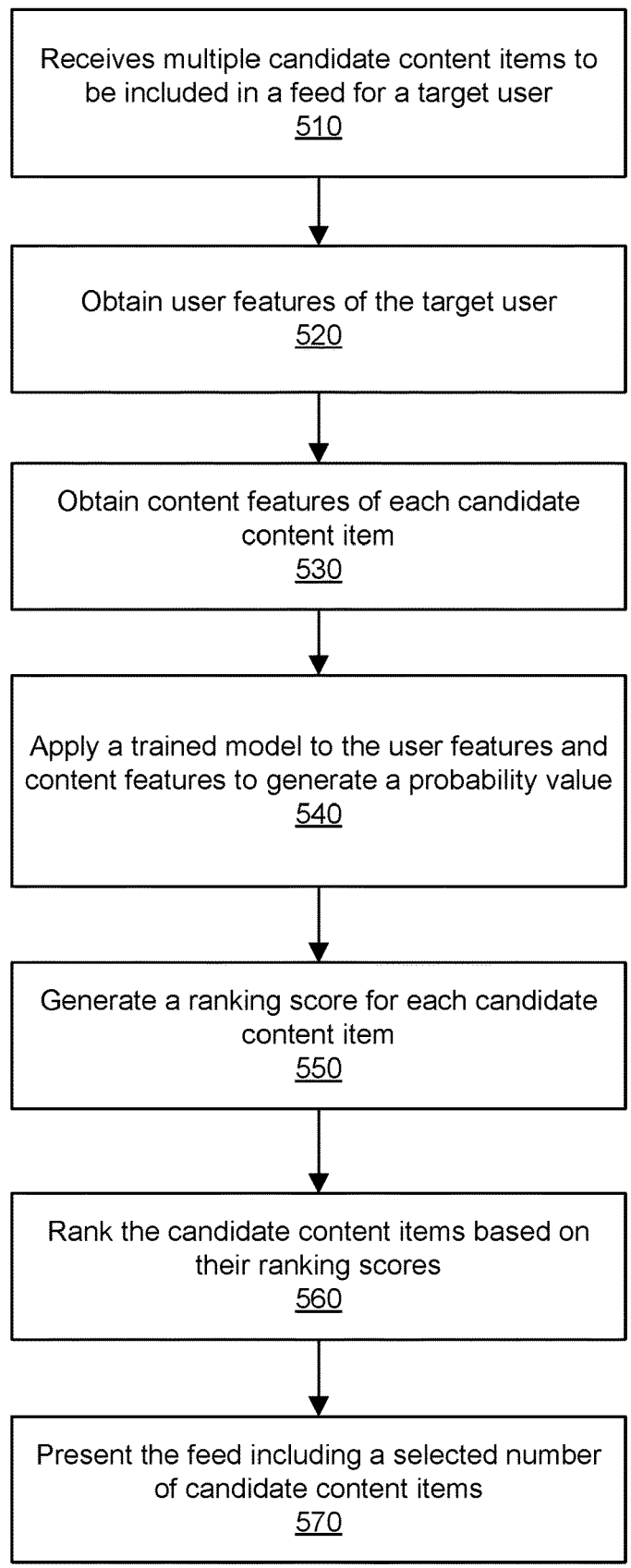
FIG. 5 is a flow chart illustrating a process for selecting candidate content items for presentation through a newsfeed to a target user using a trained post session prediction model, in accordance with an embodiment.

FIG. 5 is a flow chart illustrating a process for selecting candidate content items for presentation through a newsfeed to a target user using a trained post session prediction model, in accordance with an embodiment. In some embodiments, the method is performed by the newsfeed manager 230 of the online system 140, although some or all of the operations in the method may be performed by other entities in other embodiments. In some embodiments, the operations in the flow chart are performed in a different order and can include different and/or additional steps.

The newsfeed manager 230 receives 510 multiple candidate content items to be included in a feed for a target user of the online system 140. The online system stores user features of the target user, e.g., in the user profile store 205 and/or the action log 220. Examples of the user features of the target user include positing history of the target user, attributes of posts of the target user such as timing of the posts, and biographic, demographic, or other types of descriptive information of the target user. The newsfeed manager 230 obtains 520 user feature of the target user stored in the online system 140. Also, the newsfeed manager 230 obtains 530 content features of each candidate content item, e.g., one or more topics and content types (e.g., image, text or weblinks) associated with the candidate content item.

The newsfeed manager 230 applies 540 a trained post session prediction model to the user features and content features to generate a probability value indicating likelihood that the candidate content item causes the target user to post new content within a short period of time. In one embodiment, the machine learning module 340 trains the post session prediction model by using features and content features from training data generated from hundreds of thousands or millions of other users of the online system 100. The newsfeed manager 230 generates 550 a ranking score for each candidate content item based on the probability value of the candidate content item. In some embodiments, the ranking score equals to a posting score of the candidate content item, which is the product of the probability value multiplied by a weight assigned to posting new content action. The weight may be assigned by operators of the online system 140. In alternative embodiments, the newsfeed manager 230 considers other types of interactions of the target user with the candidate content item, such as liking, commenting, sharing, or any combination thereof. The newsfeed manager 230 may generate one or more interaction scores and aggregate the posting score with the interaction score to obtain the ranking score of the candidate content item, e.g., by summing the posting score and the interaction scores of the candidate content item.

The newsfeed manager 230 ranks 560 the candidate content items based on their ranking scores and presents 570 the feed including a selected number of candidate content items to the target user. The number of candidate content items included in the feed may be selected by the target user and/or operators of the online system. Alternatively, the newsfeed manager 230 presents all the candidate content items in the feed. The order of the candidate content items in the feed may be determined at least based on their rankings.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer method, comprising:
receiving, by an online system, a plurality of candidate content items to be included in a news feed for a target user of the online system, each candidate content item having a plurality of content features, and the target user interacting with a content item by performing one or more actions on the candidate content item;
obtaining a plurality of user features describing the target user;
for each candidate content item:
    obtaining the plurality of content features associated with each candidate content item;
    applying a model to the plurality of user features and the plurality of content features to determine a probability value indicating a likelihood that the target user performs an action associated with the candidate content item if the candidate content item is presented to the target user, the model generated by:
        obtaining training data from user features of a corpus of users of the online system and from content features of a corpus of content items of the online system;
        obtaining interactions by the users with the content items, each interaction having timing information and type of interaction, the timing information describing when a user has interacted with a content item, and the type of interaction describing a type of interaction performed by the user on the content item; and
        for each type of interaction, training a model to predict a probability that a user is likely to perform the type of interaction with the content time within a predefined period of time; and
    generating a ranking score for the candidate content item based on the probability value;
ranking the candidate content items based on their corresponding ranking scores;
selecting a number of candidate content items to be included in the news feed for the target user; and
presenting the news feed including the selected number of candidate content items to the target user.

2. The method of claim 1, wherein the user features of the target user are selected from a group consisting of: positing history of the target user, attributes of posts of the target user, and biographic, demographic, or other types of descriptive information of the target user.

3. The method of claim 1, wherein the content features of the candidate content item are selected from a group consisting of: one or more topics, timing information describing a post on the content item, and content types associated with the candidate content item.

4. The method of claim 1, wherein the action is posting new content and wherein generating a ranking score for the candidate content item based on the probability value comprises multiplying the probability value of the candidate content item with a predetermined weight of posting new content action type.

5. The method of claim 1, wherein the action is posting new content and wherein generating a ranking score for the candidate content item based on the probability value further comprises:
obtaining a posting score by multiplying the probability value of the candidate content item with a predetermined weight assigned to posting new content action type;
obtaining an interaction score for each of a plurality of other interactions; and
aggregating the posting score with the interaction score for each of the plurality of other interactions.

6. The method claim 5, where obtaining an interaction score for each of a plurality of other interactions comprises:
receiving a weight assigned to the specific type of the other interaction; and
determining a probability value that the target user interacts with the candidate content item in the specific type of the other interaction.

7. The method of claim 6, wherein the specific type of the other interaction is selected from a group consisting of: expressing a preference for the candidate content item, providing a comment associated with the candidate content item, sharing the candidate content item with another user, and any combination thereof.

8. The method of claim 5, where aggregating the posting score with the interaction score for each of the plurality of other interactions comprises:
adding the posting score of a candidate content item with the interaction score for each of the plurality of other interactions associated with the candidate content item to generate a total score; and
generating a ranking score for the candidate content item based on the generated total score of the candidate content item.

9. The method of claim 1, wherein presenting the news feed to the target. user comprises presenting the selected candidate content items in an order determined based on their rankings.

10. A non-transitory computer readable storage medium storing executable computer program instructions, the computer program instructions comprising instructions that when executed cause a computer processor to:
receive, by an online system, a plurality of candidate content items to be included in a news feed for a target user of the online system, each candidate content item having a plurality of content features, and the target user interacting with a content item by performing one or more actions on the candidate content item;
obtain a plurality of user features describing the target user;
for each candidate content item:
obtain the plurality of content features associated with each candidate content item;
apply a model to the plurality of user features and the plurality of content features to determine a probability value indicating a likelihood that the target user performs an action associated with the candidate content item if the candidate content item is presented to the target user, the model generated by:
obtaining training data from user features of a corpus of users of the online system and from content features of a corpus of content items of the online system;
obtaining interactions by the users with the content items, each interaction having timing information and type of interaction, the timing information describing when a user has interacted with a content item, and the type of interaction describing a type of interaction performed by the user on the content item; and
for each type of interaction, training a model to predict a probability that a user is likely to perform the type of interaction with the content time within a predefined period of time; and
generate a ranking score for the candidate content item based on the probability value;
rank the candidate content items based on their corresponding ranking scores;
select a number of candidate content items to be included in the news feed for the target user; and
present the news feed including the selected number of candidate content items to the target user.

11. The computer readable medium of claim 10, wherein the user features of the target user are selected from a group consisting of: positing history of the target user, attributes of posts of the target user, and biographic, demographic, or other types of descriptive information of the target user.

12. The computer readable medium of claim 10, wherein the content features of the candidate content item are selected from a group consisting of: one or more topics, timing information describing a post on the content item, and content types associated with the candidate content item.

13. The computer readable medium of claim 10, wherein the action is posting new content and wherein the instructions that cause the processor to generate a ranking score for the candidate content item based on the probability value comprise instructions that cause the processor to multiply the probability value of the candidate content item with a predetermined weight of posting new content action type.

14. The computer readable medium of claim 10, wherein the action is posting new content and wherein the instructions that cause the processor to generate a ranking score for the candidate content item based on the probability value further comprise instructions that cause the processor to:
obtain a posting score by multiplying the probability value of the candidate content item with a predetermined weight assigned to posting new content action type;
obtain an interaction score for each of a plurality of other interactions; and
aggregate the posting score with the interaction score for each of the plurality of other interactions.

15. The computer readable medium of claim 14, where the instructions that cause the processor to obtain an interaction score for each of a plurality of other interactions comprise instructions that cause the processor to:
receive a weight assigned to the specific type of the other interaction; and
determine a probability value that the target user interacts with the candidate content item in the specific type of the other interaction.

16. The computer readable medium of claim 15, wherein the specific type of the other interaction is selected from a group consisting of: expressing a preference for the candidate content item, providing a comment associated with the candidate content item, sharing the candidate content item with another user, and any combination thereof.

17. The computer readable medium of claim 14, where the instructions that cause the processor to aggregate the posting score with the interaction score for each of the plurality of other interactions comprise instructions that cause the processor to:

> add the posting score of a candidate content item with the interaction score for each of the plurality of other interactions associated with the candidate content item to generate a total score; and
>
> generate a ranking score for the candidate content item based on the generated total score of the candidate content item.

18. The computer readable medium of claim 10, wherein the instructions that cause the processor to present the news feed to the target user comprise instructions that cause the processor to present the selected candidate content items in an order determined based on their rankings.

\* \* \* \* \*